Oct. 15, 1968
D. SUVERKROP
3,405,513
CORN HARVESTER
Original Filed Oct. 19, 1964
3 Sheets-Sheet 1
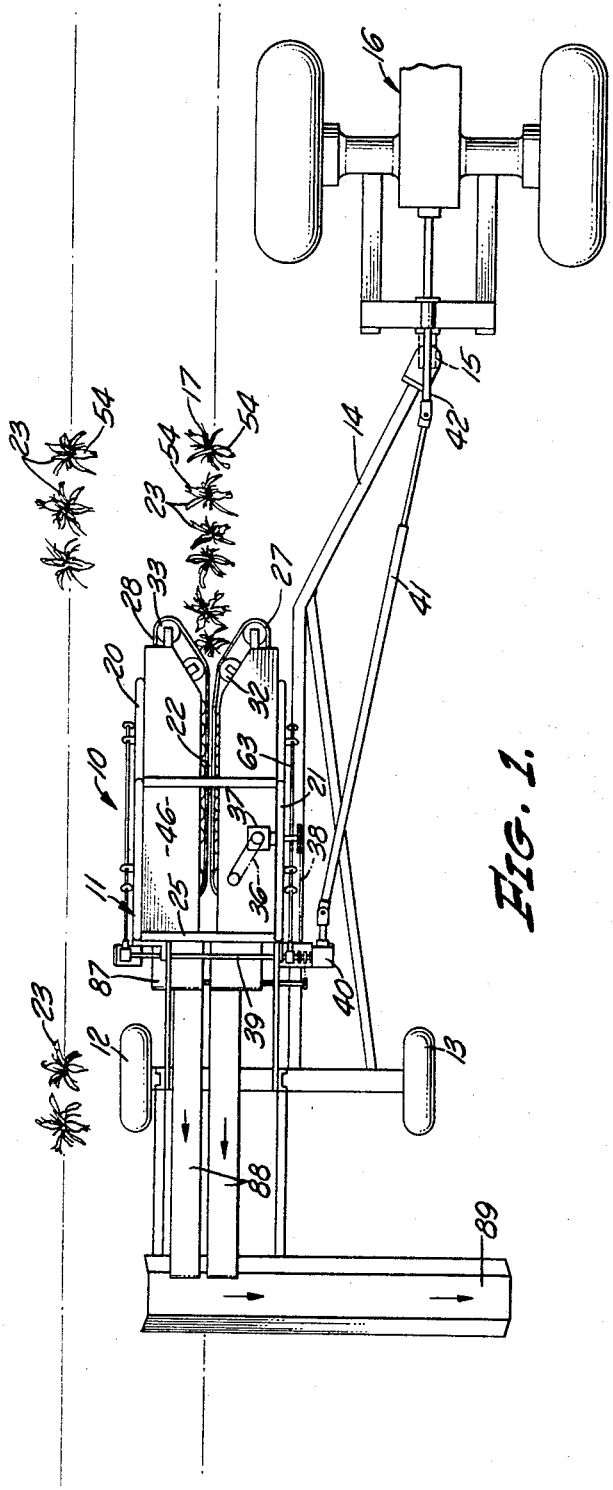
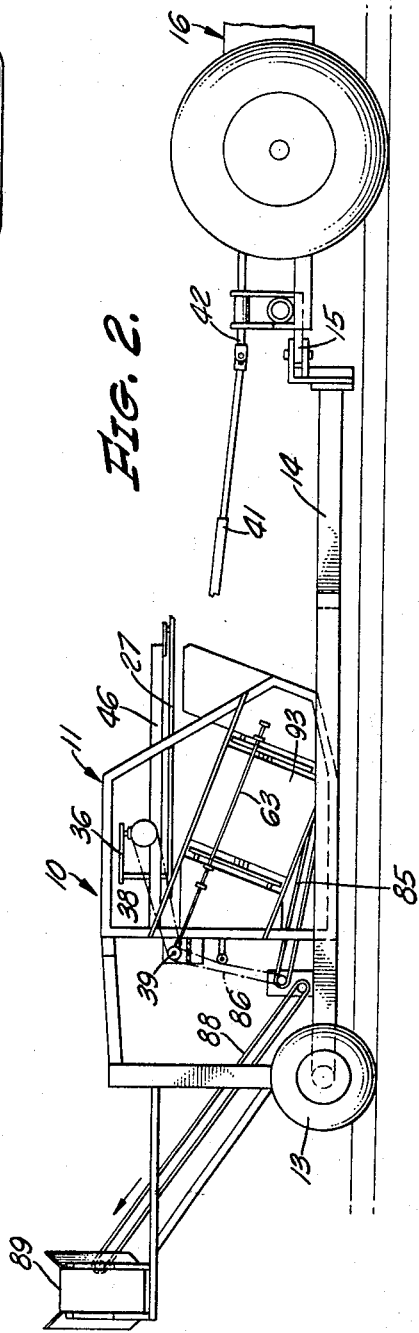
INVENTOR.
DON SUVERKROP
BY
ATTORNEYS

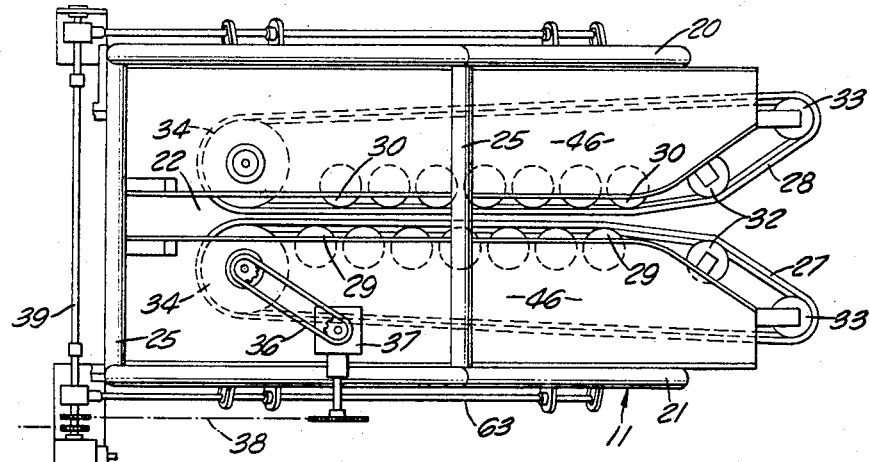
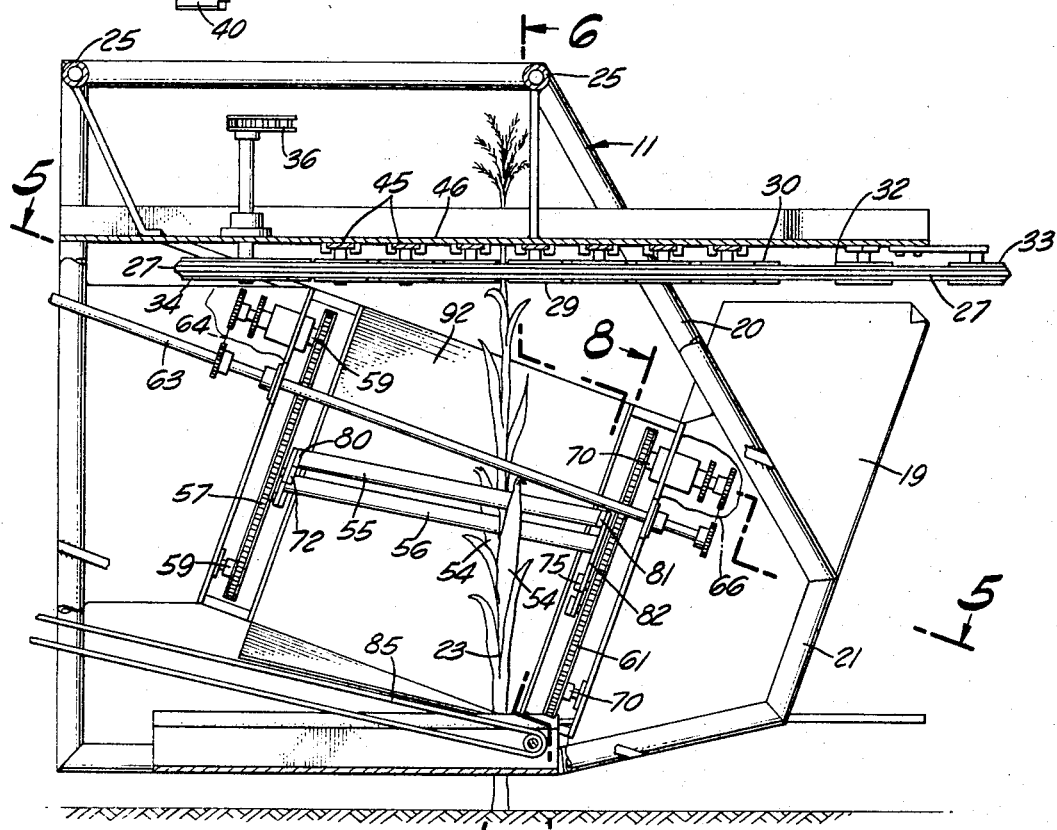

Oct. 15, 1968  D. SUVERKROP  3,405,513
CORN HARVESTER

Original Filed Oct. 19, 1964  3 Sheets-Sheet 3

INVENTOR.
DON SUVERKROP
BY Lyon+Lyon
ATTORNEYS

United States Patent Office 3,405,513
Patented Oct. 15, 1968

3,405,513
CORN HARVESTER
Don Suverkrop, Bakersfield, Calif., assignor to Hopper Machine Works, Inc., Bakersfield, Calif., a corporation of California
Continuation of application Ser. No. 404,984, Oct. 19, 1964. This application July 27, 1967, Ser. No. 656,602
10 Claims. (Cl. 56—15)

ABSTRACT OF THE DISCLOSURE

A machine for harvesting ears of corn from cornstalks growing in the field employs a mobile frame having stripper bars extending in the direction of travel and movable downward in a vertical path in contact with the cornstalks to separate ears of corn from the cornstalks. A pair of endless horizontal belts on the mobile frame have parallel reaches extending in the direction of travel for clamping the upper portion of the cornstalks between them to support the cornstalks at an elevation while the stripper bars remove the ears of corn.

---

Figure 5:
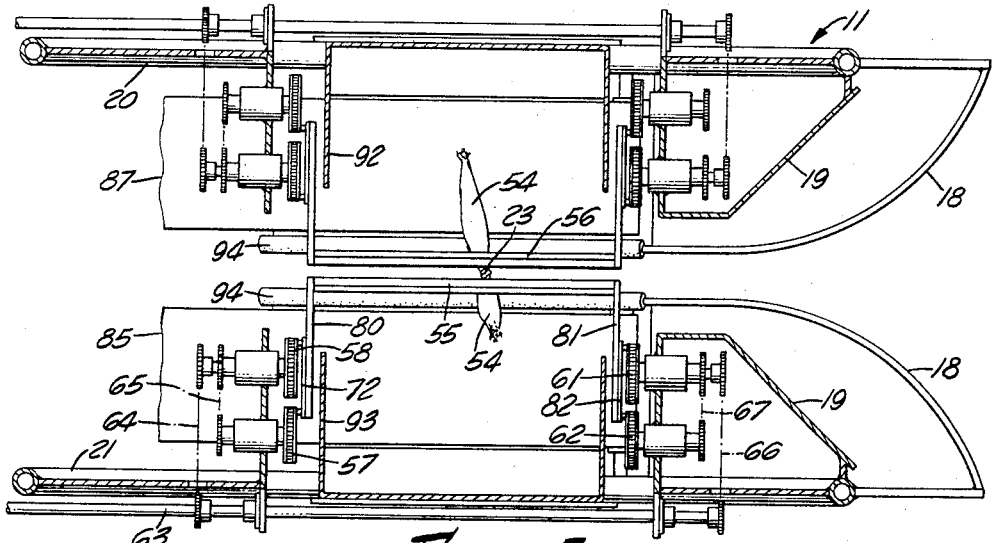

This application is a continuation of application Ser. No. 404,984, filed Oct. 19, 1964, and now abandoned.

This invention relates to harvesting machines and is particularly directed to an improved machine for harvesting ears of corn from upright cornstalks growing in a row in a field.

Separation of the ear of corn from the cornstalk is accomplished by means of a stripper bar which extends in the direction of the row and which moves downward along the cornstalk into contact with the ear at the location where it is joined to the stalk. The contact of the stripper bar with the ear of corn is sufficient to break it from the stalk, but does not bruise the kernels of corn on the ear to any objectionable degree. Study of fields of growing corn has shown that substantially all of the ears project laterally away from the rows, at least to some extent, and this accounts for test results showing that substantially all of the ears of corn are contacted and stripped from the stalks by the downward moving stripper bars, one stripper bar being mounted on each side of the row.

Accordingly, it is the principal object of this invention to provide a novel form of corn harvester employing downward moving stripper bars.

Another object is to provide a device of this type having means for clamping the cornstalks at an elevation above the location of the ears so that lateral deflection of the stalks is minimized during the downward operative stroke of the stripper bars.

Another object is to minimize relative horizontal movement between the stripper bars and the cornstalks by causing the stripper bars to move downward at an angle with respect to the mobile frame on which they are mounted, to compensate for forward travel of the machine.

Other and more detailed objects and advantages will appear hereinafter.

In the general plan of operation, the machine moves along a row of corn, and the upper portions of the cornstalks are successively gripped by horizontal endless belts moving in a reverse direction with respect to the travel of the frame along the row, so that the cornstalks are held stationary. While the cornstalks are gripped in this manner for support, the stripper bars move downward on opposite sides of the row, scraping along the cornstalks and snapping off the ears of corn as they pass by. The ears then fall into a conveyor on the machine and are carried away to a lateral discharge point.

Figure 6:
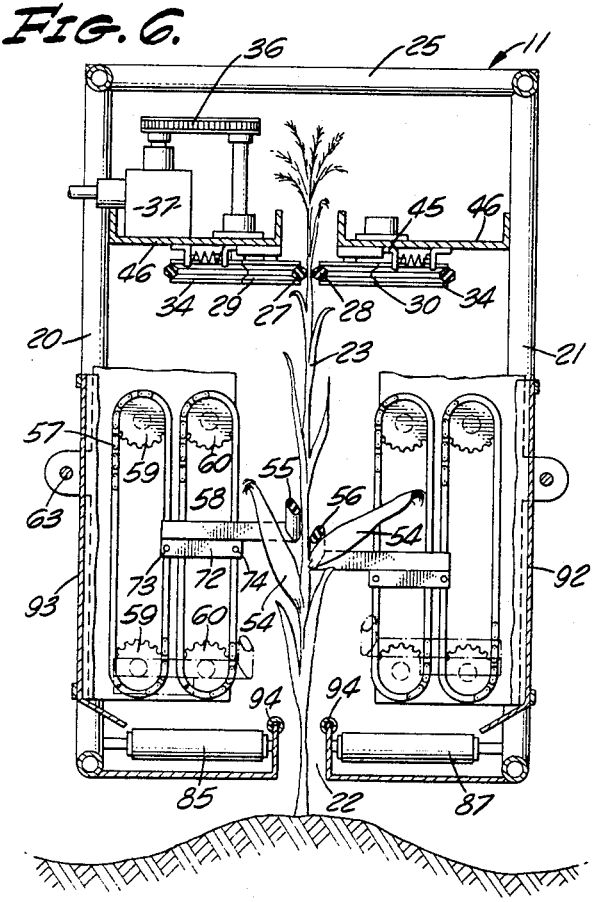
Figure 7:
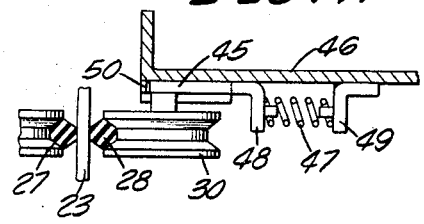
Figure 8:
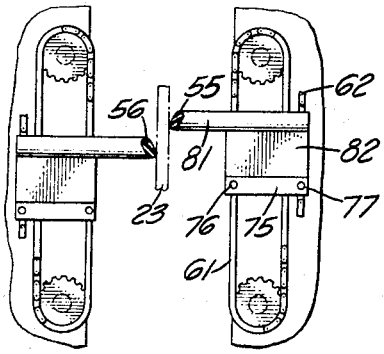

Referring to the drawings:

FIGURE 1 is the top plan view showing a preferred embodiment of the invention.
FIGURE 2 is a side elevation thereof.
FIGURE 3 is a top plan view of a portion of the device, shown on an enlarged scale.
FIGURE 4 is a side elevation, partly broken away, of the portion of the device shown in FIGURE 3.
FIGURE 5 is an inclined sectional view taken substantially on the lines 5—5 as shown in FIGURE 4.
FIGURE 6 is a transverse sectional view, taken substantially on the lines 6—6 as shown in FIGURE 4.
FIGURE 7 is a sectional detail constituting an enlargement of a portion of FIGURE 6.
FIGURE 8 is a sectional elevation partly broken away, taken substantially on the lines 8—8 as shown in FIGURE 4.

Referring to the drawings, the harvester machine generally designated 10 includes a mobile frame 11 having ground wheels 12 and 13 and having its forward end supported by means of a rigid tongue 14 on a hitch 15 provided on the tractor 16. The harvester machine 10 is offset behind the tractor 16, so that as the tractor travels along one side of a row 17 of corn, the machine 10 straddles the row 17. Two side panels 20 and 21 of the frame 11 are laterally spaced and have an unobstructed slot area 22 between them for reception of the row 17. Crossbars 25 connect the side panels 20 and 21 at an elevation above the top of the cornstalks 23. The frame is provided with guide bars 18 and guide plates 19 to insure entry of the cornstalks 23 into the slot area 22.

Means are provided for gripping the cornstalks at a relatively high elevation, and, as shown in the drawings, this means includes a pair of horizontal endless belts 27 and 28, guided on a series of spring-urged pulleys 29 and 30. The endless belts 27 and 28 are spread apart as the forward end of the frame and travel over pulleys 32 and 33 to form a throat or entrance opening for the cornstalks 23. The belts also pass around rear pulleys 34. One or both of the pulleys 34 are driven at a speed and direction which causes the adjacent reaches thereof to travel reversely with respect to the frame 10 and at zero speed relative to the cornstalks 24 gripped between them. In the device shown in the drawings, only one of the belts is driven and the other turns by means of its frictional engagement therewith. Power reaches one of the pulleys 34 by means of the chain 36, right-angle drive 37, and chain 38 from jackshaft 39. The jackshaft 39 extends horizontally across the frame 10 and receives power from the right-angle drive 40 and telescoping shaft 41 from the power take-off shaft 42 of the tractor 16.

The pulleys 29 and 30 are mounted for individual movement toward and away from the cornstalks 23 and, as shown in FIGURE 7, each of the pulleys is carried on a sliding support 45 guided for movement on a frame platform 46. A coil spring 47 is mounted between a flange 48 on the support 45 and a bracket 49 fixed on the frame platform 46. The spring 47 acts to move the pulley toward a limit stop 50. From the foregoing description, it will be understood that the upper portions of the cornstalks 23 are resiliently gripped between adjacent reaches of the endless belts 27 and 28, and the cornstalks thus gripped are supported against lateral movement in any direction.

Stripper bars 55 and 56 which extend parallel to the row 17 and parallel to the direction of travel of the mobile frame 11 are positioned on opposite sides of the cornstalks 23. The stripper bars move downward along each cornstalk 23 and break off the laterally projecting ears 54. Means are provided on the frame 10 for giving each stripper bar a predetermined path of travel, in which each bar (a) moves downward along the cornstalks 23, (b) retracts laterally away from the row 17 of cornstalks, (c)

moves upward while retracted to begin a new stroke, and (d) returns laterally into position for beginning of the downstroke along the cornstalks. The cycle of movement then repeats.

As shown in the drawings, the means for accomplishing this cyclic path of travel for each of the stripper bars 55 and 56 comprises a set of four endless chains for each stripper bar. Since each set is identical, only one need be described. The side panel 21 supports a pair of rearward chains 57 and 58 trained over duplicate sprockets 59 and 60. Similarly, a forward pair of endless chains 61 and 62 is mounted on the same side panel 21 and are trained over duplicate sprockets. The chains 57 and 58 are driven from the inclined drive shaft 63 by way of chain drives 64 and 65, and similarly the chains 61 and 62 are driven from the same drive shaft 63 through chains 66 and 67. The chains 57, 58, 61, and 62 are all the same length and have parallel reaches. As shown in FIGURE 4, the upper sprockets 59 and 70 for the chains 57 and 61, respectively, are coaxial, and the lower sprockets 59 and 70 for the chains 57 and 61 are also coaxial. The same is true of the sprockets for the chains 58 and 62. Suitable bearings are provided on the frame side panel for supporting the shafts on which the various sprockets are mounted. All of the chains move in the same direction at the same speed.

A rear carrier bar 72 is pin-connected to the chain 57 at 73 and is pin-connected to the chain 58 at 74, in such a position that the bar 72 is at right angles to the reaches of the chain. The bar 72 moves downward with the chains, then around the lower sprockets 59 and 60, and then upward with the rearward reaches of the chains, then around the upper sprockets 59 and 60, and then downward with the forward reaches of the chain. A similar carrier bar 75 is pin-connected to the chain 61 at 76 and is pin-connected to the chain 62 at 77. Carrier bars 72 and 75 remain parallel as the four chains 57, 58, 61, and 62 turn at the same speed. A horizontal strut 80 is fixed to the rearward carrier bar 72 and is also fixed to the rearward end of the stripper bar 55. Similarly, a horizontal strut 81 is fixed to the forward end of the stripper bar 55. The forward strut 81 is fixed to the forward carrier bar 75 by means of the spacer 82 so that the stripper bar 55 does not extend at right angles to the chains, but is inclined at an angle with respect thereto, as shown in FIGURE 4.

The chains are mounted at an angle on the frame 10, as shown in FIGURE 4, rather than being vertically mounted, in order to compensate for forward travel of the mobile frame 11 during the descent of the stripper bars along the cornstalks and to prevent relative horizontal movement between the stripper bars and the cornstalks. This result is obtained since the inclined chains move the stripper bars rearwardly relative to the frame which itself is moving forwardly. This feature is preserved regardless of the inclination of the stripper bars 55 and 56 with respect to the horizontal. The height of the spacer 82 at the forward end of the stripper bar 55 could be changed without affecting the basic operation of the machine. However, the presence of the spacer 82 prevents the forward end of the stripper bar 55 from too close approach to the conveyor belt 85 with the possibility of jamming ears of corn therebetween. As shown in FIGURE 2, the conveyor belt 85 slopes upward toward the rear of the machine and is driven by chain 86 on the jackshaft 39. A similar conveyor belt 87 is mounted on the other side of the machine under the chain mechanism for operating the stripper bar 56. Inclined conveyors 88 carry the ears of corn delivered by the conveyors 85 and 87 upward to the lateral discharge conveyor 89 at the rear end of the harvester 10.

In operation, the harvester 10 travels down the row 17 and straddles the cornstalks 23. As the mobile frame 11 moves forward, the adjacent reaches of the endless belts 27 and 28 move rearward at the same speed so that they remain stationary with respect to the cornstalks 23 which are clamped between them. As the machine 10 moves forward, the stripper bars 55 and 56 moves downward in scraping contact with the cornstalks 23 and strike the ears 54 of corn adjacent their respective joints with the upright cornstalk, thereby breaking the ears from the cornstalk and permitting them to fall into the open-sided collection bins 92 and 93 and onto the moving conveyor belts 85, which form the bottom walls of these bins. When the stripper bars 55 and 56 reach the lower ends of their respective operative strokes, they are retracted laterally away from the cornstalks 23 by the action of the carrier bars mounted on the adjacent pairs of endless chains. The stripper bars then move upward in retracted position and are again advanced laterally into contact with the cornstalks 23 when the carrier bars move around the upper ends of their respective chains. The cycle then repeats. Relatively soft cushioning material 94 may be provided on the paarallel horizontal rails which form the lower inner boundaries of the collection bins 92 and 93, and this cushioning material prevents damage to ears 54 of corn which may fall on these stationary rails.

Having fully described my invention, it is to be understood that I am not to be limited to the details herein set forth, but that my invention is of the full scope of the appended claims.

I claim:

1. A machine for harvesting ears of corn projecting laterally and upwardly from upright cornstalks, each ear thereby defining with the cornstalk a downwardly converging notch, said machine comprising:
   (a) a mobile frame adapted to travel along a row of cornstalks;
   (b) a substantially straight stripper bar supported from said frame to travel along said row with said frame and past said cornstalks in close proximity thereto within a vertical plane located between said cornstalks and the tips of said ears;
   (c) and stripper bar operating means carried by said frame for imparting a downward translatory movement to said stripper bar whereby said stripper bar enters the notch between an ear of corn and its stalk and strikes said ear adjacent said stalk thereby to sever the ear from the stalk;
   (d) said stripper bar operating means being an endless drive having a downwardly moving inner reach with respect to the cornstalks and an upwardly moving outer reach, said stripper bar being secured to said endless drive and extending transversely thereto inwardly of the inner reach thereof whereby said stripper bar is moved upwardly essentially clear of the ears of corn.

2. A machine, as defined in claim 1, wherein:
   (a) a pair of stripper bars and stripper bar operating means are disposed on opposite sides of the row of cornstalks.

3. A machine, as defined in claim 1, wherein:
   (a) said stripper bar operating means moves said stripper bar downwardly and rearwardly with respect to the mobile frame to compensate for forward travel of the mobile frame and minimize horizontal movement between the stripper bar and the cornstalks.

4. A machine, as defined in claim 1, which further comprises:
   (a) a conveyor disposed under said stripper bar to receive ears of corn severed thereby.

5. A machine, as defined in claim 1, which further comprises:
   (a) a pair of horizontal belts supported from said mobile frame at a height to clamp the upper portions of the cornstalks therebetween;
   (b) and means for driving said belts rearwardly at essentially the same velocity as the forward movement of said mobile frame thereby to hold each cornstalk upright while said stripper bar severs ears of corn therefrom.

6. A machine for harvesting ears of corn projecting laterally and upwardly from upright cornstalks, each ear thereby defining with the cornstalk a downwardly converging notch, said machine comprising:
   (a) a pair of complementary mobile frame structures joined at their upper ends above said stalks and disposed on opposite sides of a row of cornstalks and defining therebetween a narrow slot adjacent the root ends of the cornstalks for passage of the row between the frame structures;
   (b) a conveyor for each frame structure extending longitudinally thereof in position to receive ears of corn severed from said stalks;
   (c) a stripper bar operating means for each frame structure; said means including stripper bar supports movable downwardly in a path close to said stalks and upwardy in a path further from said stalks;
   (d) a stripper bar secured to each operating means and positioned thereby to extend generally along said row in close proximity to said stalks and in position to move downwardly between said operating means and said stalks and into the notch between an ear of corn and its stalk and strike the ear adjacent said stalk to sever the ear therefrom and to move upwardly clear of the other ears.

7. A machine, as defined in claim 6, which further comprises:
   (a) a pair of stalk clamping belts carried by said frame structures near the upper ends of said stalks, said belts having reaches passing on opposite sides of said stalks to clamp the stalks therebetween;
   (b) and means for driving said belts rearwardly at essentially the same speed as the forward movement of said mobile frame structures thereby to hold said stalks upright while said stripper bars sever the ears of corn therefrom.

8. A machine, as defined in claim 7, wherein:
   (a) said stripper bar operating means moves said stripper bars downwardly and rearwardly with respect to the mobile frame structures to compensate for forward travel of said frame structures and minimize horizontal movement between said stripper bars and said cornstalks.

9. In a machine for harvesting ears of corn from upright cornstalks growing in a row in a field, the combination of:
   (a) a mobile frame adapted to straddle and travel along the row;
   (b) horizontal endless belt means movably supported on said mobile frame for engaging the upper portions of the cornstalks to support them at an elevated position;
   (c) a pair of stripper bars positioned below said endless belt means on opposite sides of the row and extending in the direction of travel of the mobile frame;
   (d) and means on the mobile frame for moving said stripper bars downward along the cornstalks to separate ears of corn from the supported cornstalks;
   (e) said means including a pair of endless chains at each end of each stripper bar, each pair of chains being duplicates mounted in a common transverse plane, carrier members each pin-connected to one chain of each pair, and means connecting one end of each stripper bar to one of said carrier members.

10. In a machine for harvesting ears of corn from upright cornstalks growing in a row in a field, the combination of:
   (a) a mobile frame adapted to straddle and travel along the row;
   (b) horizontal endless belt means movably supported on said mobile frame for engaging the upper portions of the cornstalks to support them at an elevated position;
   (c) a pair of stripper bars positioned below said endless belt means on opposite sides of the row and extending in the direction of travel of the mobile frame;
   (d) and means on the mobile frame for moving said stripper bars downward along the cornstalks to separate ears of corn from the supported cornstalks;
   (e) said means including a pair of endless chains at each end of each stripper bar, each pair of chains being duplicates mounted in a common transverse plane, the plane being inclined in the direction of travel of the mobile frame, carrier members each pin-connected to one chain of each pair, and means connecting one end of each stripper bar to one of said carrier members.

References Cited
UNITED STATES PATENTS

| | | | |
|---|---|---|---|
| 693,066 | 2/1902 | Richards | 56—117 |
| 1,121,895 | 12/1914 | Brown. | |
| 1,168,467 | 1/1916 | Bell | 130—31 |
| 1,404,813 | 1/1922 | Varker | 56—103 |
| 1,719,033 | 7/1929 | Viking | 56—15 |
| 1,774,450 | 8/1930 | Murphy | 56—17 |
| 2,526,543 | 10/1950 | Davies | 56—15 |
| 2,763,114 | 9/1956 | Carruthers | 56—1 |
| 2,782,581 | 2/1957 | Thomson | 56—17 |
| 3,025,654 | 3/1962 | Jones | 56—1 X |

ABRAHAM G. STONE, *Primary Examiner.*

P. A. RAZZANO, *Assistant Examiner.*